United States Patent [19]

Mottate

[11] Patent Number: 4,511,189
[45] Date of Patent: Apr. 16, 1985

[54] ENDLESS LINEAR MOVEMENT ROLLER BEARING

[75] Inventor: Tatsuo Mottate, Mitaka, Japan

[73] Assignee: Nippon Thompson Co., Ltd., Tokyo, Japan

[21] Appl. No.: 499,367

[22] Filed: May 31, 1983

[30] Foreign Application Priority Data

Jul. 14, 1982 [JP] Japan ................................ 57-123427

[51] Int. Cl.³ ............................................. F16C 29/06
[52] U.S. Cl. .................................................... 308/6 C
[58] Field of Search ............. 308/6 R, 3 R, 3 A, 6 C, 308/6 B

[56] References Cited

U.S. PATENT DOCUMENTS 4,302,059 11/1981 Teramachi .......................... 308/6 C
4,426,119 1/1984 Mottate ............................... 308/6 C

*Primary Examiner*—John Petrakes
*Assistant Examiner*—David Werner
*Attorney, Agent, or Firm*—Trexler, Bushnell & Wolters, Ltd.

[57] ABSTRACT

A roller bearing for linear movement of the type wherein the rollers circulate endlessly is provided. A direction changing path is provided in the shape of a circular curve reversing relative to the direction of movement of the bearing, a connecting load track and return hole at each end, for circulating the rollers. The shape of such direction changing path is obtained in such a manner that the projection of the path onto a plane perpendicular to the direction of movement of the bearing is also a circular curve. As a result, width and height of the bearing unit are made optimum so as to achieve an overall most compact bearing unit. Also a preload device and grease are arranged. The compact endless linear movement roller bearing thus obtained is made without any decrease in the bearing load capacity of prior art apparatus the same size. The roller bearing has good rigidity due to the preload device and has very small frictional resistance due to the spatially circularly curved shape of the direction changing path for the rollers.

1 Claim, 12 Drawing Figures

$\theta = 0°$ $\theta = 45°$
$R = 70 \text{ mm}$

ENDLESS LINEAR MOVEMENT ROLLER BEARING

BACKGROUND OF THE INVENTION

Conventionally roller bearings for linear movement are used, particularly for heavy linearly moving bodies such as in machine tools. Among them, those which use roller bearings for limited linear movement and in which rollers are successively rotatably disposed and engagingly retained in a plate-like retainer have a restriction in the stroke of a linearly moving body, and if such stroke is to be increased, there was a defect that the number of rollers to be engagingly retained in the retainer of the roller bearing for linear movement had to be increased, and thus the size, particularly in the lengthwise direction, became large.

Meanwhile, in the case of a roller bearing capable of making linear movement wherein numerous rollers are not engagingly retained in a retainer, namely, for instance, as shown in FIG. 12, in the case of a prior art endless linear movement roller bearing wherein each adjacent roller 30 has its axis differing 90° alternately, and wherein both ends of the linear paths of load track 31 and return track 32 are in communication, the circularly shaped direction changing paths 33, 33 for smoothly performing the direction changing movement of rollers 30 are arranged in the same plane as the plane of tracks 31, 32, as shown in FIGS. 11 and 12. When comparison is made against the prior art slide bearing and considering at a section perpendicular to the direction of movement of the bearing, since it is impossible to install a preload device, it is impossible to increase the rigidity of the roller bearing comparable to the prior art slide bearing. Also the sectional height or width increases in addition to an increase in weight. Therefore, the characteristics of a linear movement roller bearing of high load capacity, small starting resistance, relatively simple maintenance, capability to be preloaded, etc. could not always be utilized, and there were restrictions in the field of use as well as scope of use. In other words, there was a great demand for a compact endless linear movement roller bearing with high rigidity.

In particular, as shown in FIG. 1, the endless linear movement roller bearing, wherein right angle V groove track surfaces 5, 6 which from load zone are respectively provided on a vertical outer side surface 2 of track rail 1 and on a vertical inner side surface 4 of casing 3 which makes a linear movement and mounts on said track rail 1, and wherein roller 7 endlessly circulates, is superior being capable of supporting the upward and downward load in the equal amount. However, in this bearing, the return hole of square shape has to be positioned at 0° shown by 8a, namely, has to be in the same horizontal plane as track surface 5, 6. Thus, there is a defect that the width of the casing becomes maximum, and moreover, such position overlaps with the preload bolt 10 which horizontally forces bearing plate 9 providing track surface 6. As a result, it was impossible to utilize the previously described superior bearing load characteristics induced by the track surface 5 being provided on the vertical outer side surface 2 and the track surface 6 being provided on the vertical inner side surface 4.

SUMMARY OF THE INVENTION

The present invention relates to an endless linear movement roller bearing unit wherein a plurality of rollers endlessly circulate to perform a linear movement of the bearing. More particularly, the purpose of the present invention is to provide an endless linear movement roller bearing which is compact. The present invention provides a compact endless linear movement roller bearing in which its performance, as a linear movement roller bearing is superior to conventional ones having high rigidity, and is free of previously described various defects.

According to the invention, the projection of the direction changing path of the rollers onto a plane perpendicular to the direction of movement of the bearing casing is a circular curve. Thus, it became possible to provide a return hole for the rollers at an inclined upward position relative to the load track. This allowed installation of the preload device, and thus increased rigidity of the roller bearing, and at the same time attained compactness of the bearing without decrease of load capacity. The directional changing path thus obtained also effected extremely low frictional resistance.

DETAILED DESCRIPTION OF THE EMBODIMENT

The construction of the embodiment of the present invention will be described in the following with reference to the drawings.

Figure 1:
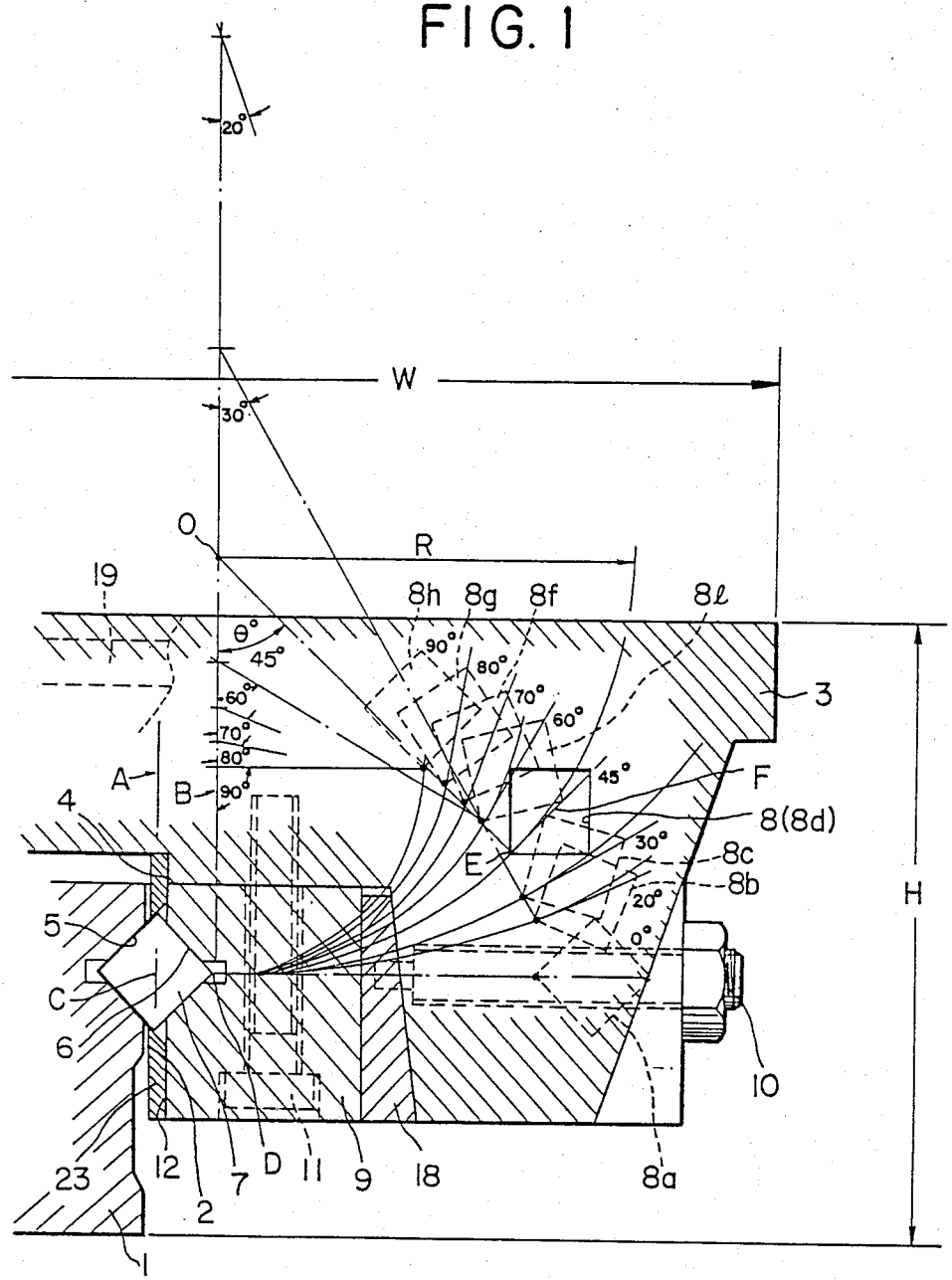
FIG. 1 is a partial elevational section of the embodiment of the present invention.
Figure 7:
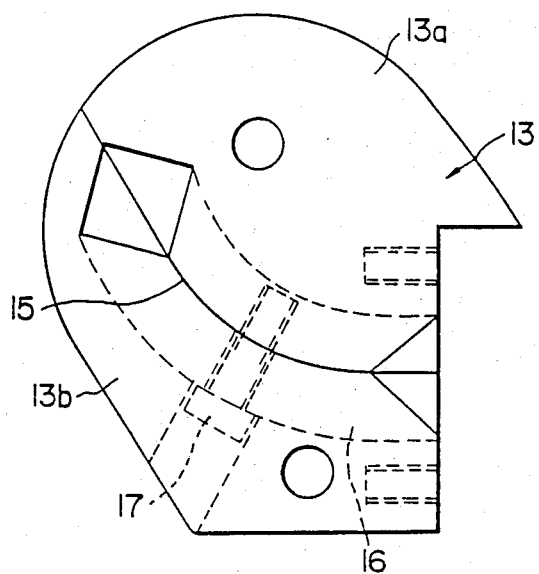
FIG. 7 is an elevational view of the side plate.
Figure 8:
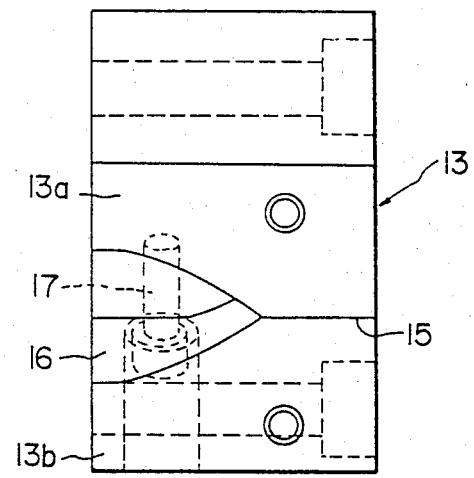
FIG. 8 is a view seen in the arrow direction VIII of FIG. 7.
Figure 9:
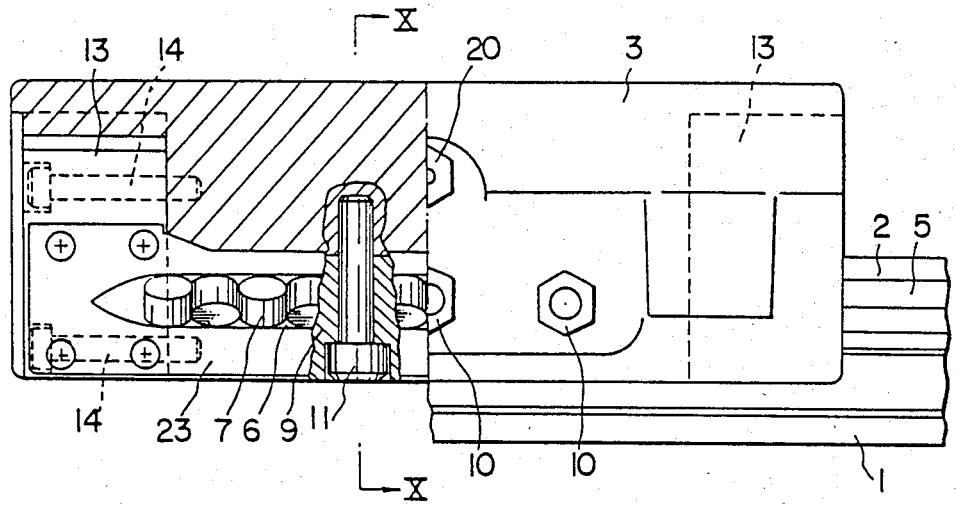
FIG. 9 is a side view in which the section is taken along line IX—IX of FIG. 10, and the outlines of fastening bolts are shown at the left half portion.
Figure 10:
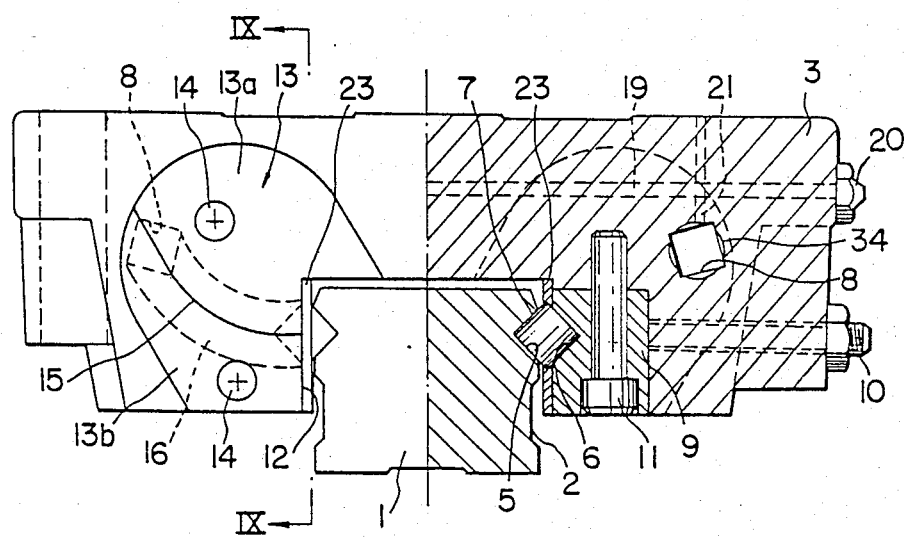
FIG. 10 is an elevational view of which the section taken along line X—X of FIG. 9 is shown at the right half portion.
Figure 11:
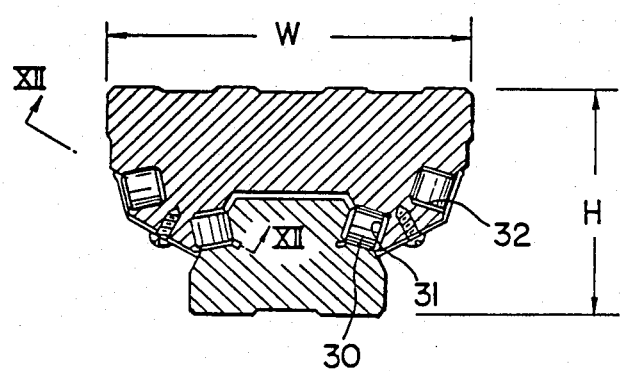
FIG. 11 is a section of a prior art example.
Figure 12:
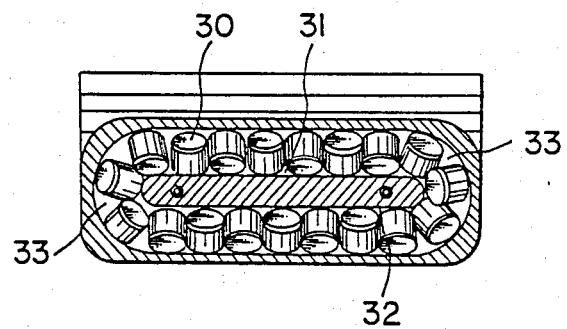
FIG. 12 is a section taken along line XII—XII of FIG. 11.

The embodiment as shown in FIGS. 1, 9 and 10, respectively, is an endless linear movement roller bearing wherein casing 3 makes a linear movement mounting on track rail 1 having a substantially rectangular section with vertical outer side surfaces 2 at left and right. Bearing plate 9 is fastened by fastening bolt 11 onto inner surface 4 for the mounting of said casing 3. Straight track surfaces 5, 6 of right angle V shape are respectively formed, opposing each other, on a vertical inner side surface 12 of said bearing plate 9 and on a opposing outer side surface 2 of said track rail 1. At the load zone formed by said track surfaces 5, 6, a plurality of rollers 7 having diameter and length approximately same, are mounted, adjacent roller 7 having their axes differing 90°. A return hole 8 is provided in parallel with said track surface 6 and outwardly and upwardly inclined thereto. Side plates 3 are fastened to both ends of said casing 13 with fastening bolts 14. As shown in FIGS. 7, 8 and 10, said side plate 13 consists of an upper side plate 13a and a lower sideplate 13b. A direction changing path 16 of circularly curved shape relative to the axial direction, namely, the direction of movement of the roller bearing, is formed at the location of abutting surface 15 of said upper and lower plates 13a, 13b, allowing communication of both ends of the straight and parallel paths of track surfaces 5, 6 and return hole 8, for permitting smooth direction changing movement of the rollers 7. As shown in FIGS. 7 and 10, the projection of said abutting surface 15 on the plane perpendicular to the direction of movement of the roller bearing is a circular curve and similarly the projection of said direction changing path 16 on the plane perpendicular to the direction of movement of the roller bearing is a circular curve.

The reason why the side plate 13 is formed separately into an upper plate 13a and a lower plate 13b is to allow easy machining of the direction changing path which is a circular curve both in the axial direction and in the direction perpendicular thereto, namely, which is a spatially circularly curved shape. Thus, as far as the forming of such direction changing path is possible, naturally the side plate 13 can be made in one piece.

Said upper plate 13a and lower plate 13b are abutted at abutting surface 15 and fastened by bolt 17.

The preload adjustment of the rollers 7 and thus the positional adjustment of the bearing plate 9 against the casing 3 is performed by a preload adjustment device. In the embodiment shown in FIG. 1, the bearing plate 9 is forced by the raising or lowering of wedge 18 caused by preload bolt 10. In the embodiment of FIG. 10, the preload adjustment is carried out by directly forcing the bearing plate 9 by the preload bolt 10. The position and attitude of the return hole relative to said track surface 6 and the course of direction changing path 16 are determined as follows:

As shown in FIGS. 1 and 10, near the lower portion of casing 3, the preload bolt 10 for the bearing plate 9 is provided so as to reach the bearing plate 9 from the side of the casing 3, and the axis of the preload bolt 10 is approximately in the same horizontal plane as the track surface 6.

Also at the upper portion of the casing 3, as shown in FIGS. 1, 9 and 10, grease hole 19 is horizontally drilled through in the casing 3, one end of which mounts a grease nipple 20. Said grease hole 19 communicates with branch line 21 for lubricating the return hole 8.

Since said preload bolt exists, the return hole cannot be formed in a position where it overlaps with the preload bolt 10 as shown by 8a of FIG. 1. Similarly it cannot be formed as in 8f, 8g, 8h where it overlaps with the grease hole 19. Therefore, the position to form the return hole 8 is restricted to an intermediate position between the preload bolt 10 and the grease hole 19.

Figure 2:
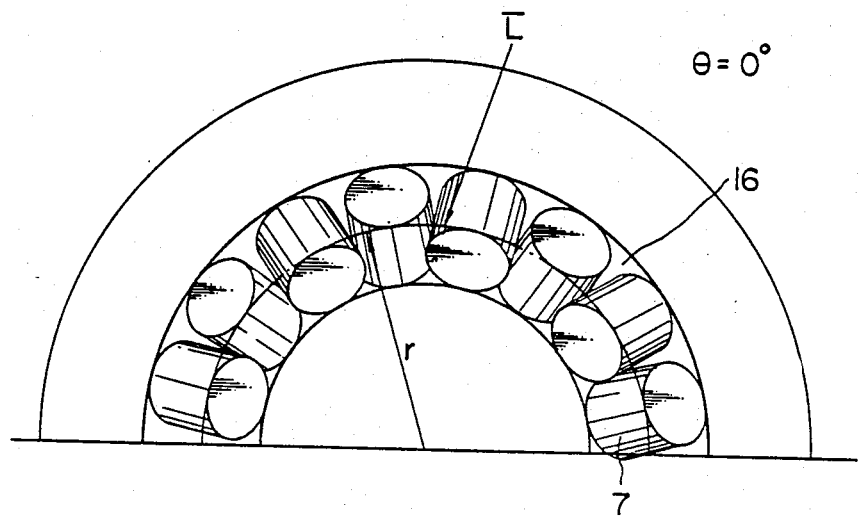
FIG. 2 is a plan view of the direction changing path when $\Theta=0°$.

Nextly, the direction changing path 16, as described previously, is a passage for leading the rollers 7 held in the load zone track surfaces 5, 6 and, as shown in FIG. 2, and for making a 180° direction change up to the return hole 8. In order to make a smooth direction change, the direction changing path 16 is necessarily of a circularly curved shape. If the radius of direction changing path is assumed to be r, there will be a minimum value of r depending on the size of the roller. If the travelling length of the center of the roller 7 in the direction changing path 16 is assumed to be L, $$L = \pi r.$$

As described previously, the position of the return hole 8 has to be at an intermediate position where it does not overlap with the preload bolt 10 and the grease hole 19, namely, it has to be determined at a position shown by 8c, 8d, 8e. Furthermore, the rollers 7 which are rolled along the direction changing path 16 must also make a smooth direction change in a vertical direction. Therefore, the projected shape of the direction changing path 16 onto the plane perpendicular to the direction of movement of the roller bearing has to be a circular curve, as shown in FIG. 1 and FIG. 3.

Figure 3:
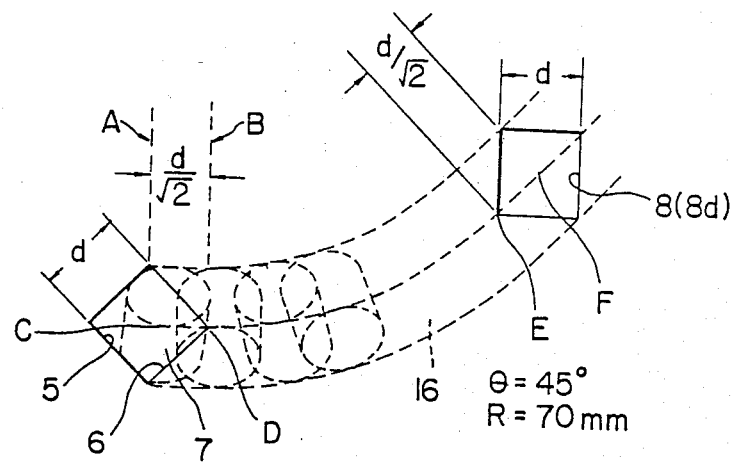
FIG. 3 is an elevational view of the direction changing path when $\Theta=45°$.

As shown in FIG. 3, the direction changing path 16 consists of a horizontal direction changing portion CD, spatial direction changing portion DE and planar direction changing portion EF, for the center of the roller 7.

Figure 5:
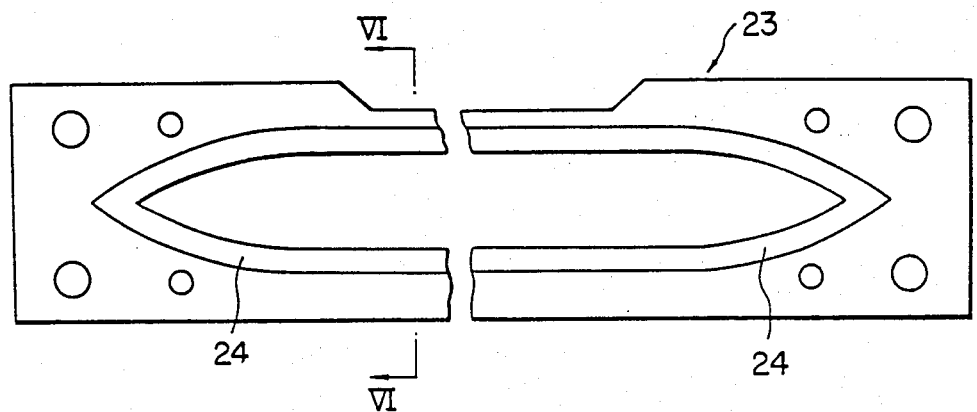
FIG. 5 is a side view of the retainer.
Figure 6:
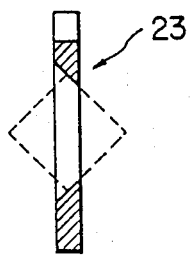
FIG. 6 is a section taken along line VI—VI of FIG. 5.

As shown in FIG. 1, near both ends of load zone, the roller 7 in the load zone is guided by leaving portion 24 of retainer 23 as shown in FIGS. 5 and 6 and moves in a horizontal direction, leaving the track surface 5. Then the position of the center of the roller moves from point C of perpendicular A to point D of perpendicular B in a horizontal plane. If the diameter and length of the roller 7 are assumed to be d, as shown in FIG. 3, the distance between perpendiculars A and B is approximately $$\frac{d}{\sqrt{2}}.$$

The roller 7 the center of which has reached point D on the said perpendicular B leaves the retainer 23, and is guided by the direction changing path 16 on the side plate 13 such as shown in FIGS. 7 and 8, then gradually changes its direction as shown in FIG. 3, the position of the center of the roller 7 moving on a spatially circular curve until it reaches point E.

The spatially circular curve and point E on said curve can be obtained as follows.

If the projected length of a circular arc DE in FIG. 1, which is the projection of the moving path of the center of the roller 7 as described previously, is assumed to be K, then K will be constant, and point E will lie on a circular arc having its center O on perpendicular B and a radius R. If the central angle on said circular arc DE is assumed to be Θ°, $$K = \frac{\pi \theta R}{180}.$$

Since K is constant, $$R = \frac{180K}{\pi \theta}$$

For instance, if K=55 mm

| θ° | R mm |
| --- | --- |
| 10 | 314.880 |
| 15 | 209.920 |
| 20 | 157.440 |
| 25 | 125.952 |
| 30 | 104.960 |
| 35 | 89.966 |
| 40 | 78.720 |
| 45 | 69.973 |
| 50 | 62.976 |

-continued

| θ° | R mm |
|---|---|
| 55 | 57.251 |
| 60 | 52.480 |
| 65 | 48.443 |
| 70 | 44.983 |
| 75 | 41.984 |
| 80 | 39.360 |
| 85 | 37.045 |
| 90 | 34.987 |

If a circular arc is drawn from D by Θ and R obtained as previously described, the end point of each such circular arc will be point E. If a return hole of square shape having one of its diagonals tangential to each such circular arc and having length d for one side, is drawn, as shown in FIG. 1, return holes 8a, 8b, 8c, 8e, 8f, 8g, 8h can be obtained at 10° intervals.

The return hole 8 (8d) shown in FIGS. 1 and 3 is the case when Θ°=45°, and said return hole 8 (8d) has a square cross section with one of its diagonals being at 45° with the horizontal plane. Said diagonals are tangents of the respective circular arcs at point E and the angle formed by the diagonal and the horizontal plane is equal to the central angle Θ° of each such circular arc. Each return hole 8a, ... 8h in FIG. 1 is shown with such angle Θ°.

If the midpoint of said diagonal is F, then $\overline{EF}$ is the previously described planar direction changing portion of the center of the roller. Thus, the center of the roller 7, when reaching point F from point E, moves on a plane which makes said angle Θ° with the horizontal plane in a similar fashion as between C and D, and when the center of the roller reaches point F, roller 7 arrives at the return hole 8, rolling smoothly.

In the embodiment shown in FIG. 1, it is clear that, when the return hole is provided in the range of Θ=0−20°, it overlaps with the preload bolt 10, and when the return hole is provided in the range of Θ=70°−90°, it overlaps with the grease hole 19, and in this embodiment, the suitable position of the return hole is in the range of Θ=30°−60°.

If the return hole can be provided in said range of Θ=30°−60°, it is possible to make both W and H small, and thus a small compact endless linear movement roller bearing unit can be realized.

As described previously, the direction changing path consists of a horizontal direction changing portion on a horizontal plane, a spatial direction changing portion comprising a spatially circular curve, and a planar direction changing portion on a plane making an angle Θ with the horizontal plane, and thus, by properly selecting and combining the length and radius of the circular curve for the previously described three portions depending on the diameter and length of the roller, it is possible to connect the track surfaces 5, 6 and return hole 8 having different positions and direction of diagonals, allowing smooth and endless circulation of the rollers 7.

The retainer 23 shown in FIGS. 1, 5, 6, 9 and 10 has the functions of preventing the rollers from falling off of the casing 3 when the casing 3 is removed from the track rail 1 and of guiding the rollers held at the load zone between track surfaces so as to leave in a horizontal plane at the leaving portion 24.

The side plate 13 shown in FIGS. 7, 8, 9 and 10 is provided with the direction changing path 16 which smoothly guides and changes the direction of the rollers 7, which have left the load zone through the leaving portion 24 of the retainer 23, towards the return hole 18.

The side plate 13 is mounted so as to abut end portions of both the bearing plate 9 and the return hole 8 of the casing 3.

Figure 4:
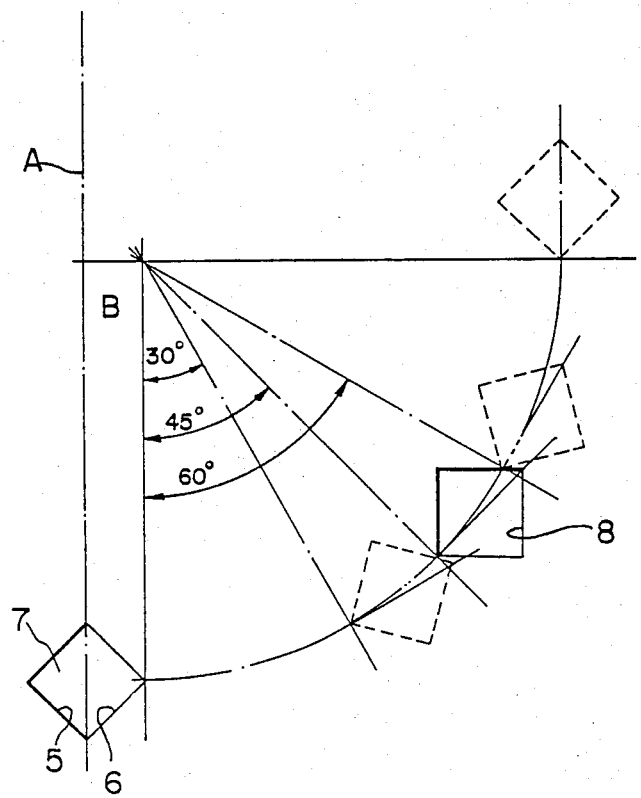
FIG. 4 is an illustrative drawing showing the elevational positions of track surface and return hole.

Further, FIG. 4 shows a relation of position and attitude of the return hole 8, when said R is constant and only Θ varied, and which shows that one of the diagonals of the square section return hole 8 lies in the tangential direction of the circular arc.

Also as shown in FIG. 10, when providing the return hole 8 on the casing 3, the return hole can be formed by broaching, etc. after the return hole is drilled with an under hole 34 having a diameter smaller than the diagonal of said return hole.

Although in the previously described embodiment, description was made for the endless linear movement roller bearing unit in which both the outer side surface of the track rail and the inner side surface of the casing oppose each other on vertical planes, there could naturally be a roller bearing unit in which the opposing surfaces are slanted. Namely, the direction changing path of the present invention can be carried out for a return hole position relative to track surfaces of the load zone whose both side surfaces are not vertical but slanted.

By constructing the previously described direction changing path, it was possible to realize the most compact casing for the endless linear movement roller bearing, and the whole bearing unit was allowed to be made compact without varying the load capacity. Moreover, it was possible to make the moving resistance at the direction changing path extremely small and by locating the preload device at the proper position, the bearing has become to have a high rigidity with small frictional resistance despite its compactness.

The present invention has an arrangement as described in the claim. It is an endless linear movement roller bearing wherein the projection of the direction changing path of the rollers onto a plane perpendicular to the direction of movement of the casing is also a circular curve. Thus it became possible to provide a return hole at an upwardly inclined position relative to the track surface, namely, the return hole is not in the same horizontal plane as the track surface. In addition to be provided with preload device and grease hole, the width and height of the endless linear movement roller bearing including the track rail and casing were made compact without any decrease in the bearing load capacity, and further, it became possible to hold the frictional resistance extremely small.

What is claimed is:

1. A roller bearing for linear movement with endlessly circulating rollers comprising a track rail and a casing linearly movable thereon, said track rail and casing having confronting surfaces having cooperating confronting linear track portions therein, a plurality of bearing rollers in said linear track portions, means in said casing providing a return track portion interconnected with said linear track portions, and a further plurality of said bearing rollers in said return track portion, said bearing rollers endlessly circulating through said linear track portion and said return track portion, said return track portion including a direction changing path which reverses the direction of said rollers in a circular curve, said direction changing path having a projection onto a plane perpendicular to the direction of movement of the bearing rollers which is a circular curve, thus allowing a smooth direction changing movement of the rollers.

* * * * *